United States Patent Office

Re. 27,671
Reissued June 12, 1973

27,671
STAINLESS STEEL

Harry Tanczyn, Baltimore, Md., assignor to
Armco Steel Corporation

No Drawing. Original No. 3,000,729, dated Sept. 19, 1961, Ser. No. 856,925, Dec. 3, 1959. Application for reissue Mar. 1, 1971, Ser. No. 111,774
Int. Cl. C22c *39/14*
U.S. Cl. 75—126 F 5 Claims

Matter enclosed in heavy brackets [ ] appears in the original patent but forms no part of this reissue specification; matter printed in italics indicates the additions made by reissue.

My invention, generally relating to stainless steels, has particular application to the straight chromium grades, especially the well-known A.I.S.I. Type 410, the composition of which is given below.

An object of my invention is to provide a hardenable stainless steel of the character indicated which is readily amenable, in simple and direct manner, to the realization of desired intermediate hardness values in close response to commercial specifications.

A further object is to provide a stainless steel of the general type described wherein, without substantial sacrifice of hardness and strength, there are achieved improved toughness and improved impact strength, all at minimum cost and in simple, direct and reliable manner.

Other objects and advantages in part will be obvious and in part more fully pointed out during the course of the following disclosure.

My invention, accordingly, resides in the combination of elements, composition of ingredients, and in the relation of each of the same to one or more of the others, all as described herein, the scope of the application of which is indicated in the claims at the end of this specification.

As conducive to a more ready understanding of my invention, it may be noted at this point in the disclosure that the straight chromium grades of heat-hardenable stainless steels basically are of martensitic structure. They are comparatively inexpensive and of widespread utility. Particularly is this true of the A.I.S.I. Type 410, this analyzing 0.15% max. carbon, 1.00% max. manganese, 1.00% max. silicon, 0.040% max. phosphorus, 0.030% max. sulphur, 11.50% to 13.50% chromium, and remainder iron.

The steel of above analysis is well suited for general use where resistance to corrosion and/or to heat is a requisite. As well, this steel as presently produced, employs a minimum of critical and costly alloying ingredients. It displays only fair machining properties, however.

Characteristic in the use of steels of the general type noted is a schedule of thermal treatments, this including rapid cooling from a hardening temperature of say, about 1800° F. and a subsequent tempering treatment. As hardened from 1800° F. the steel displays a hardness in the approximate range of 43 to 44 Rc. It is to be noted, however, that by suitable variations in the tempering treatment a rather wide range of mechanical properties may be developed.

Customarily, and following hardening resort is made to a tempering anneal at somewhat lower temperature. This serves both to relieve stresses and, incident to hardening, perhaps to increase the toughness of the steel, while substantially retaining required hardness. However, it is this tempering process which is relied upon to control the precise hardness of the particular steel for its intended purpose, and to bring the same to a selected value somewhat below its maximum value. As noted above, the maximum hardness ordinarily is in the range of Rc 43–44.

Now, the very fact that the Type 410 is of general utility has frequently caused the customer to specify within close limits both the composition and the mechanical properties of the steel which he orders. A frequent requirement is that the steel be processed at the mill to an intermediate hardness value within the narrow range, of approximately Rc 26–32.

In practice, however, it is extremely difficult to bring the steel within such narrow limits. This is largely because of the rapid change of hardness which takes place when the steel is subjected to a tempering operation; the ameliorating effect is unduly dependent upon relatively small differences in the temperature at which the tempering operation is conducted. The steel is much too sensitive. Thus in the present condition of the art, and in order to closely approximate the required hardness it frequently is necessary to reheat the metal several times during the tempering process, and this by trial and error, first at one temperature and then at another, until the specified range of hardness is had. This practice is tedious and time-consuming, with attending expense represented in tie-up of labor and equipment. These difficulties are particularly severe when, as is usually the case, a large tonnage of steel in the form of sheet, strip, plate, bars, rods or wire is undergoing treatment. For here, uniform temperature both within the batch and from one batch to another, is rendered difficult, it not impossible. And so is the response to tempering treatment.

Another characteristic disadvantage observed in the straight chromium steels is a larger grain structure and a comparatively low value of toughness. That is, these steels are found to be normally somewhat brittle. Thus, and typically, the steels are found to have a maximum of only about 40 ft. lbs. Charpy. It, of course, is apparent that any substantial increase in toughness which could be brought about would appreciably increase the field of application of the steels. And, in turn, this would importantly increase or enhance economic acceptance.

An important object of my invention, therefore, is to provide in direct and simple manner, with comparatively limited additional cost, a steel wherein hardness may be positively brought to selected intermediate values, and this in but a single tempering treatment, while the grain size of the steel is materially lowered and both toughness and resistance to impact are importantly increased and controlled.

Referring now to the practice of my invention, I have found that the addition to the straight chromium grades of stainless steel, of comparatively small yet closely-controlled quantities of columbium will appreciably reduce the criticality of the change in hardness with variations of temperature in a stress-relieving tempering treatment; a broader range of tempering temperatures results, this assuring substantially the same hardness values in spite of differences in the tempering temperatures. These superior results are most surprising, and are vividly accented, when it is considered that although the prior art discloses many instances where columbium has been added to stainless steel, in no instance have my advantageous results attended such practice. The amount of the columbium addition in my steel is highly critical, especially as it relates to the carbon content, all as appears more fully hereinafter. Columbium is costly material but since the quantity of columbium required is so small, the relatively high cost of this material is not prohibitive.

As a practical matter, tantalum usually is employed along with the columbium. I find that the addition of a small amount of tantalum in substitution for a corresponding part of the columbium additive, results in no appreciable diminution of advantageous results had by columbium alone (that is, without an admixture of tantalum) as a constituent of the steel. At the same time, and since tantalum is much less expensive than columbium, this significantly reduces the cost of the alloying ingredients.

Columbium introduced into the steel within the critical narrow limits not only gives superior control over the precise intermediate hardness value realized through tempering and assures uniform hardness even with an appreciable spread in the temperatures actually attained in a batch of steel being treated, but also gives an important increase in the toughness of the steel which is uniform throughout the batch. Furthermore, microscopic study discloses an importantly reduced size of grain within the metal; a more ductile product results.

My further investigations have disclosed that vanadium, as a replacement for part of the columbium, will likewise improve the characteristics of temper hardness, as against the precise temperature of the tempering treatments. However, vanadium itself produces no beneficial effect on either the grain-size of the steel or the toughness; in fact vanadium induces brittleness. Perhaps best results at minimum cost are had with columbium and vanadium together (or columbium along with tantalum when combined with vanadium). With the combination of ingredients it is the columbium, or mixture thereof with tantalum, which controls the size of the grain, while it is both the vanadium and columbium additive (or columbium together with tantalum) which broadens the hardness control. In combining the ingredients vanadium is present in about the same amount as the columbium alone or as the columbium along with tantalum.

Typically, in the practice of my invention, columbium and tantalum may be present in amount ranging from about 0.05% to about 0.35% of the steel, with vanadium present in amount ranging from about 0.05% to about 0.20%.

Broadly, the steel of my invention essentially consists of about [.70%] to .14% carbon, .10% to 1.25% manganese, 001% to .050% phosphorus, .001% to .050% sulphur, 10% to 1.00% silicon, 10.0% to 14.0% chromium, 1.00% max. nickel, .05% to .35% columbium and tantalum together, without or with vanadium in the amount of .05% to .20%, the columbium, tantalum and vanadium together amounting to .05% to .35%, and remainder substantially all iron. Molybdenum, tungsten and nitrogen are present as residuals, the molybdenum and tungsten each in amounts not exceeding about .20%, however, and nitrogen in amounts up to about .05%.

To further illustrate the practice of my invention, it may be noted that a preferred steel, employing as an additive columbium along with tantalum, analyzes approximately as follows: Carbon .12%, manganese, .50%, phosphorus .010%, silicon .35%, sulphur .010%, chromium 12.0%, nickel .20%, columbium and tantalum together .15%, and remainder iron. Another such preferred steel analyzes about the same, except that the amount of columbium together with tantalum is lowered to about 0.12%, while vanadium is included in amount of about 0.10%. The precise analysis is as follows: Carbon .12%, manganese .50%, phosphorus .010%, sulphur .010%, chromium 12.0%, silicon .35%, nickel .20%, columbium and tantalum .12%, vanadium .10%, and remainder iron.

My stainless steel is hardened upon cooling from a temperature range of say about 1650° to 1950° F., enduring for about four hours. Cooling is had either in air or by quenching in oil or water. Following such hardening, the metal is then subjected to further heat treatment as suggested above, both for the relief of stresses and to impart requisite temper to the metal. This is had by reheating the steel at a temperature between about 500° and 1200° F.

As specifically illustrative of the practice of my invention I made three heats of stainless steel with chemical composition as set forth in Table I below, two according to my invention (heats 2305 and 2306) and one, for comparison purposes, according to the prior art (heat 2305):

TABLE I

Chemical analysis of three 12% chromium stainless steels

| Heat No. | C | Mn | P | S | Si | Cr | Ni | Cb-Ta |
|---|---|---|---|---|---|---|---|---|
| R2304 | .11 | .48 | .010 | .009 | .30 | 11.81 | .26 | [1] .005 |
| R2305 | .12 | .44 | .011 | .009 | .28 | 12.30 | .24 | .13 |
| R2306 | .12 | .44 | .010 | .012 | .28 | 12.02 | .24 | .25 |

[1] Residual.

Samples of the three steels of Table I were then hardened and tempered, this latter under three different conditions conveniently identified as A, B and C. A schedule of the three hardening and tempering treatments is as follows:

A—1800° F. ½ hr.—oil quench and 1125° F. 4 hours—air cool.

B—1800° F. ½ hr.—oil quench and 1200° F. 4 hrs.—air cool.

C—1800° F. ½ hr.—oil quench and 1200° F. 4 hrs.—air cool and 1100° F. 4 hrs.—air cool.

More particularly, in A the several samples of the three steels were hardened by heat-treatment at 1800° F., enduring for about half an hour, followed by an oil quench. I thereupon tempered the samples at a temperature of about 1125° F. for a period of approximately four hours. Following this, I cooled the metal in air. In B the tempering was accomplished at about 1200° F. In all other respects, however, treatment B corresponds with treatment A. And treatment C followed the procedure of treatment B, but in addition, the samples were given a subsequent and second tempering treatment, this at a reduced temperature of about 1100° F. This second tempering operation endured for a period of about 4 hours following which the samples were cooled in air.

The mechanical properties of the three steels of Table I, these under the three conditions of heat-treatment A, B and C are given in Table II

TABLE II

Mechanical properties of the three steels of Table I

| Heat No. | Cond. | U.T.S. p.s.i. | 0.2% Y.S. p.s.i. | Percent el. in 2" | Percent red. area | Charpy V-notch impact ft./lbs. |
|---|---|---|---|---|---|---|
| R2304 | A | 122,800 | 105,600 | 24 | 58 | 35 |
| R2305 | A | 135,800 | 119,300 | 20 | 64 | 79 |
| R2306 | A | 136,800 | 121,800 | 17 | 55 | 80 |
| R2304 | B | 110,300 | 92,400 | 22 | 68 | 60 |
| R2305 | B | 123,800 | 108,400 | 20 | 64 | 104 |
| R2306 | B | 124,300 | 108,800 | 20 | 65 | 108 |
| R2304 | C | 110,300 | 94,200 | 22 | 67 | 54 |
| R2305 | C | 123,300 | 107,400 | 20 | 66 | 107 |
| R2306 | C | 123,300 | 107,800 | 21 | 66 | 95 |

The test results given above clearly establish that under all three conditions of heat-treatment the strength of the steel is greater where columbium-tantalum has been added, in controlled amount, according to the practice of my invention. Moreover, and surprisingly so, there is a great increase in the impact strength of my steel as compared to the steel of the prior art. Actually, the notch impact strength is found to have been more than doubled.

Moreover, upon comparing the results in condition B with those of condition A, it will be observed that while there is some reduction in tensile strength, the toughness of the metal is materially improved. In general, the small sacrifice in ultimate tensile strength and yield strength is found to be unimportant, as compared to the great increase in toughness as indicated by the V-notch impact figures.

Upon comparing the mechanical properties of my steel in conditions C and B, it is seen that little or nothing is gained by the further tempering treatment condition C. Actually, the first tempering is accompanied by slight decrease in strength values, together with some slight loss of impact strength. Thus, through the inclusion of columbium-tantalum only a single tempering treatment is required to bring about nice control of the strength and hardness, together with material improvement in impact strength.

And as a further matter, while the columbium-tantalum-containing steels of my invention were observed to have a fine grain structure, a comparatively coarse grain structure characterized the commercial Type 410 of the pior art. This coarse grain structure was vitually unchanged, upon inclusion of a generally like amount of vanadium. And this same result was observed where vanadium was added along with an admixture of tungsten.

And finally, I obtain in my steel a consistency in the temper of hardness had, throughout a batch of sheet, strip, wire, or the like, in spite of temperature differences which are reached throughout the batch. For in a batch of commercial 410 stainless steel wire the tempered hardness was observed to range in value from about Rockwell 13C to 20C. Such values are bad, not only because they are low, but because of their wide range. In my steel, however, in which columbium is present with or without vanadium, the hardness variation from batch to batch was found to range in value only about Rockwell 2C. Such close adherence to specification is well within acceptable commercial limits.

The amount of columbium employed in my steel (or columbium plus tantalum) is in every sense critical. For where the columbium content is lower than .05% no benefit is had. And where the additive is present in percentages beyond those heretofore disclosed, that is, in excess of .35%, disappointing results are observed. Sharp loss in strength qualities are noted. For satisfactory results, it is best that the columbium (or columbium and tantalum) does not exceed about three times the carbon content of the steel. Even better results are obtained when this ratio is limited to not more than about one or two times the carbon content.

The vanadium content, where such addition is made, likewise is critical; with vanadium exceeding .15% and a total of columbium-tantalum and vanadium exceeding about .35%, a loss of strength is noted. And of even greater consequence, with an excess of these ingredients, and particularly where there is residual molybdenum exceeding .20% and the sum of molybdenum, columbium-tantalum and vanadium exceeds .45%, the forgeability suffers (there is an inclination to split in forging). The transverse ductility likewise suffers. This I attribute to an excess of delta-ferrite.

I prefer to employ vanadium along with the columbium-tantalum because I find that, for some reason unknown to me, a lesser quantity of the group is required than with the columbium-tantalum alone.

As to the reason why the desirable results of fine grain structure, high impact strength and consistent response to tempering treatment are had in the steel of my invention, reflection suggests that the columbium present combines with much of the carbon present to form columbium carbides. These carbides are not readily soluble in the steel at the temperatures of heat-treatment or even the temperatures of hot-working. Rather they are distributed throughout the metal, and in the same manner inhibit grain growth, perhaps serving as nuclei for new grains with the result that there are more grains but these of smaller size. As noted above, the desired results are had with or without vanadium. These results, however, are not had with vanadium alone. The vanadium carbides which form are considerably more soluble in the steel and present nothing to inhibit grain growth. I am by no means certain, however, of the precise cause of the results which are obtained. By consequence, I do not desire to be bound by the theoretical explanation here offered. Suffice it to say that my desirable results are faithfully achieved, and this, with the certainty requisite for commercial feasibility.

The loss of strength and impact values which accompany an excess of columbium and tantalum is attributed to a tendency of these ingredients to tie up the carbon within the metal, and to take the same out of solution. This sacrifices the hardenability of the metal, as well as its resultant hardness and strength.

Thus it will be seen that I provide in my invention a straight chromium grade of hardenable stainless steel in which there is had the various objects hereinbefore set forth together with many practical advantages. The steel of my invention reliability responds to temper treatment to give improved ductility, fine grain structure and high impact strength. Moreover, it favorably responds to tempering treatment, which response changes less sharply with temperature than the steel of the prior art.

All the foregoing, as well as many other practical advantages attend the practice of my invention.

It is apparent that, once disclosed many modifications of the present embodiments of my invention will suggest themselves to those skilled in the art. And, similarly, that many embodiments of the underlying inventive thought will likewise come to mind, all falling within the scope of this disclosure. Accordingly, I intended the foregoing description to be considered as simply illustrative, and not as comprising limitation.

I claim as my invention:

1. A quench hardenable straight-chromium, low carbon stainless steel [comprising] *essentially consisting of* 10.0% to 14.0% chromium, .07% to .14% carbon, [and remainder substantially all iron] in which the response in hardness of the metal to variation in tempering temperature thereof is appreciably retarded and improved toughness in the hardened and tempered condition is had, through the inclusion in the metal of .05% to .35% columbium-tantalum, and 0% to .20% vanadium, the precise amount of [these ingredients within these ranges] *columbium-tantalum* being about one to [three] *two* times the carbon content, *and remainder substantially all iron.*

2. A quench hardenable straight-chromium stainless steel of improved toughness and strength in the hardened and tempered condition, said steel essentially consisting of carbon .07% to .14%, manganese .10% to 1.25%, phosphorus .001% to .050%, sulphur .001% to .050%, silicon .10% to 1.00%, chromium 10.0% to 14.0%, nickel 1.00% maximum, columbium and tantalum .05% to .25%, vanadium .05% to .20%, the sum total of columbium, tantalum and vanadium additions amounting to about .05% to .35%, and the remainder substantially all iron.

3. A quench-hardenable straight-chromium stainless steel of improved toughness and strength in the hardened and tempered condition, said steel essentially consisting of carbon .07% to .14%, chromium 10.0% to 14.0%, columbium and tantalum .05% to .35%, vanadium .05% to .20%, with the sum of columbium and vanadium amounting to .05% to .35% and about one to three times the carbon content, and the remainder substantially all iron.

4. A quench-hardenable straight-chromium stainless steel of improved toughness and strength in the hardened and tempered condition, said steel essentially consisting of carbon about .12%, chromium about 12.0%, columbium and tantalum about .12% to .15%, vanadium 0% to about .10%, and the remainder substantially all iron.

5. A straight-chromium stainless steel having quench-hardening properties and wherein temper hardness can be closely controlled within required value wherein impoved toughness and strength are had in the hardened and tempered condition, said steel comprising about 10.0% to 14.0% chromium, about 0.07% to 0.14% carbon, about 0.10% to 1.25% manganese, about 0.001% to 0.050% phosphorus, about 0.001% to 0.050% sulphur, about 0.10% to 1.00% silicon, nickel up to 1.00%, columbium and tantalum together in the amount of 0.05% to 0.35%, vanadium about 0.05% to 0.15%, with columbium and tantalum together with vanadium in sum total about .05% to .35%, and up to about three times the carbon content of the steel, and the remainder substantially all iron.

References Cited

The following references, cited by the Examiner, are of record in the patented file of this patent or the original patent.

UNITED STATES PATENTS 2,469,887 5/1949 Olcott ---------- 75—126

FOREIGN PATENTS 741,936 12/1955 Great Britain.

HYLAND BIZOT, Primary Examiner

U.S. Cl. X.R.

75—126 E